United States Patent [19]

Demarest et al.

[11] Patent Number: 5,033,229
[45] Date of Patent: Jul. 23, 1991

[54] LIQUID DELIVERY BAIT STATION

[75] Inventors: Scott W. Demarest, Caledonia; M. Keith Kenneth, Racine; Russell H. Petersen, Mt. Pleasant, all of Wis.

[73] Assignee: S. C. Johnson & Son, Inc., Racine, Wis.

[21] Appl. No.: 595,325

[22] Filed: Oct. 10, 1990

[51] Int. Cl.⁵ .......................................... A01M 25/00
[52] U.S. Cl. .................................. 43/131; 43/132.1; 43/124
[58] Field of Search ...................... 43/124, 131, 132.1, 43/110, 107

[56] References Cited

U.S. PATENT DOCUMENTS

| | | | |
|---|---|---|---|
| D. 273,032 | 3/1984 | Woodruff | D22/19 |
| D. 278,842 | 5/1985 | Woodruff | D22/19 |
| 1,372,780 | 3/1921 | Schenke | 43/131 |
| 1,573,278 | 2/1926 | Schlesinger | 43/131 |
| 2,123,995 | 7/1938 | Harroun | 43/131 |
| 2,977,711 | 4/1961 | Starr | 43/131 |
| 4,251,946 | 2/1981 | Lindley | 43/131 |
| 4,563,836 | 1/1986 | Woodruff et al. | 43/131 |
| 4,761,912 | 8/1988 | Dyer et al. | 43/131 |
| 4,793,093 | 12/1988 | Gentile | 43/132.1 |
| 4,800,844 | 1/1989 | Van Gilst | 119/51.5 |
| 4,823,506 | 4/1989 | Demarest et al. | 43/131 |
| 4,837,969 | 6/1989 | Demarest | 43/131 |

FOREIGN PATENT DOCUMENTS

AU-B-
73766/87  12/1987  Australia .
2128463A  5/1984  United Kingdom .

Primary Examiner—Kurt Rowan
Assistant Examiner—Chuck Y. Mah

[57] ABSTRACT

A bait station for the control of insects, especially roaches, that has a reservoir portion for holding a liquid bait-toxicant formulation which fits into a base structure. The base structure has around its circumference a ramped structure that defines a central well area. Rising from the ramped structure are a plurality of support walls which both support the reservoir portion and define access openings to the central well area. The bait-toxicant formulation is controllably released from the reservoir into the central well area.

6 Claims, 2 Drawing Sheets

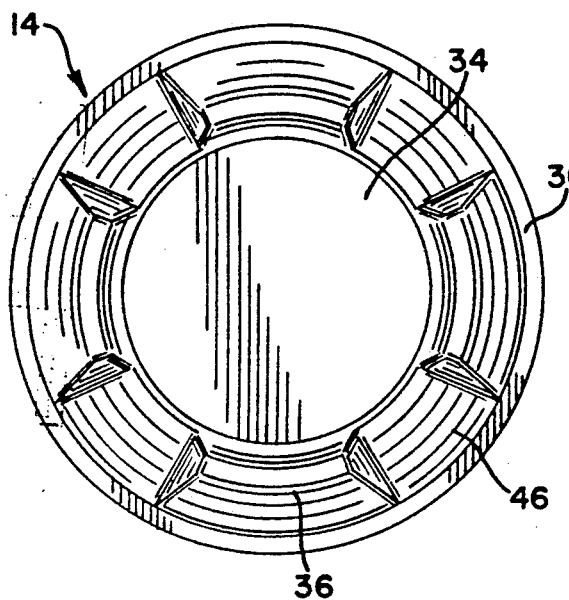
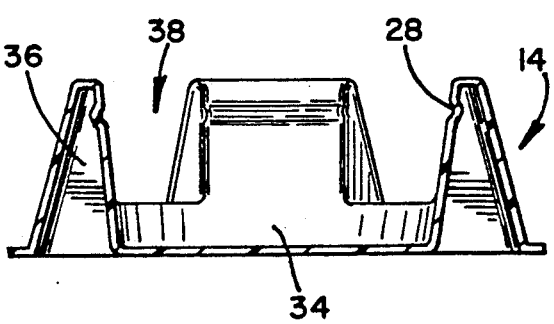
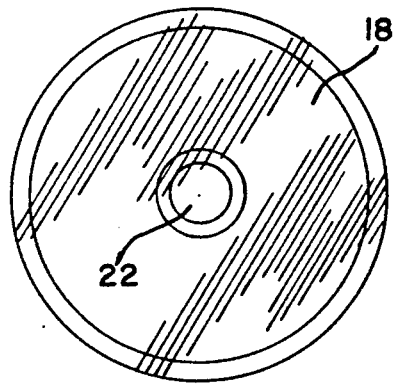
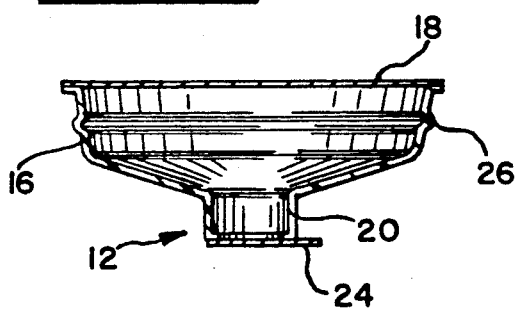
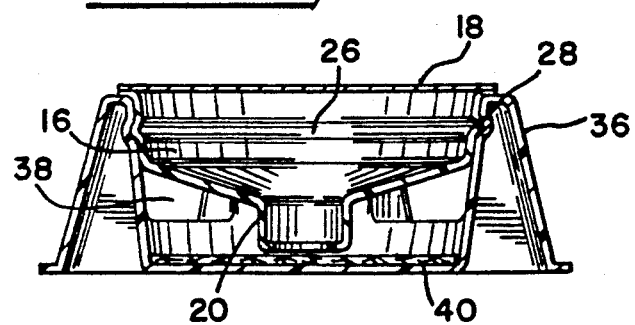

LIQUID DELIVERY BAIT STATION

TECHNICAL FIELD

This invention relates to the field of devices for control of insects and more particularly to a bait station that allows controlled delivery of a liquid bait and toxicant solution into a central area which can be accessed by insects.

BACKGROUND ART

Many devices for holding a poisonous bait to control crawling insects are known, ranging from simple cardboard tubes open at both ends with the bait glued inside, to more elaborate structures that have a centrally enclosed bait accessible by peripheral openings.

Such devices usually hold a dry bait and toxicant preparation.

Older examples are U.S. Pat. No. 1,372,780, which discloses a bell shaped top having side apertures, which fits over and clamps to a dish shaped base, and U.S. Pat. No. 2,123,995, which discloses a flat piece of sheet metal which is bent over an insecticidal substance to partially cover the substance while allowing insects direct access.

U.S. Pat. No. 4,563,836 to Woodruff et al. discloses an insect feeding station comprised of a simple cover which fits over a base, the base having external wall segments with entrance gaps between them and interior walls placed opposite the gaps and surrounding a central bait area. The outer walls of the present invention are formed by the cover; then entrance apertures are oriented at an angle to the required line of approach to the bait, and a ramped structure surrounds the bait well.

U.S. Pat. No. 4,837,969 to Demarest discloses a bait station having an apertured multi-lobed cover which fits over a base which has a central bait well formed by a ramped structure and inner walls which intersect the ramped structure and serve to guide insects toward the bait well.

U K. Pat. No. GB 2 128 463 A discloses an insect feeding station having an aperture-containing cover placed over a base, the base having baffle means for directing an insect toward the central bait section.

Australian Patent AU-B-73766/87 discloses the known fact that roaches are attracted to water, and claims a method of attracting roaches by including water in a poison bait composition, and suggests that the composition may be contained in a cup-like container or an absorbent medium attached to a feeding station. This patent further states that suitable bait stations are disclosed in U.S. Pat. No. 4,563,836, which discloses a feeding station designed to enclose a bait tablet or other non-liquid bait composition.

Such bait stations provide two of the three things preferred by roaches: darkness and harborage. However, there is a third preference roaches have that is not provided by such bait stations: moisture.

SUMMARY DISCLOSURE OF INVENTION

The present invention provides a simple inexpensive bait station for passive control of insects, particularly roaches, that not only provides darkness, and harborage, making the bait station an attractive hiding place for roaches, but also provides a source of moisture, which roaches seek. In the present invention, this moisture is a liquid bait-toxicant solution.

The bait station of the present invention has two main parts: a reservoir and a base structure. The reservoir is essentially funnel shaped, with a larger end which tapers down to a narrow opening at the bottom end. The larger end is covered over and the narrow opening has means for controllably releasing liquid from the reservoir.

The base structure has a central well area defined by an encircling angled support structure. Rising from and projecting above the support structure are a plurality of walls which function both as support walls and serve to define a plurality of insect access openings. Within the central well area is an absorbent pad.

The bait station is assembled by a user who first activates the means for controllably releasing the liquid and then fits the reservoir into the base structure so that the narrow opening at the bottom of the reservoir is located above and within the central well area of the base structure. The liquid is then released from the reservoir onto the absorbent pad.

BRIEF DESCRIPTION OF DRAWINGS

FIG. 3 is a top plan view of the base structure of the bait station.

FIG. 4 is a side sectional view of the base structure of the bait station.

FIG. 5 is a top plan view of the reservoir and reservoir cover of the bait station.

FIG. 6 is a side sectional view of the reservoir of the bait station.

FIG. 7 is a side sectional view of the assembled bait station.

BEST MODE FOR CARRYING OUT THE INVENTION

Figure 1:
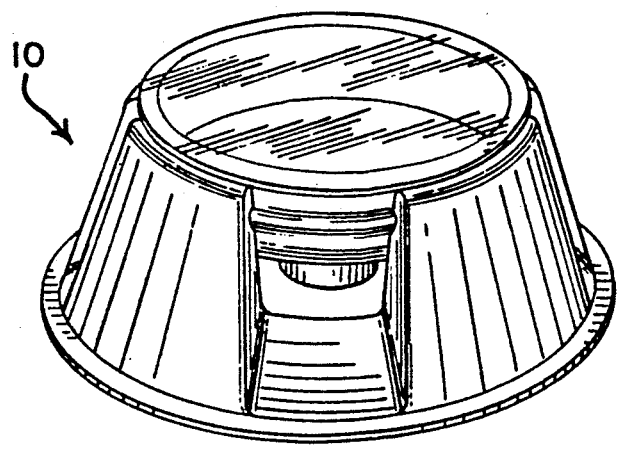
FIG. 1 is a perspective view of the assembled bait station.

FIG. 1 shows a perspective view of assembled bait station 10.

Figure 2:
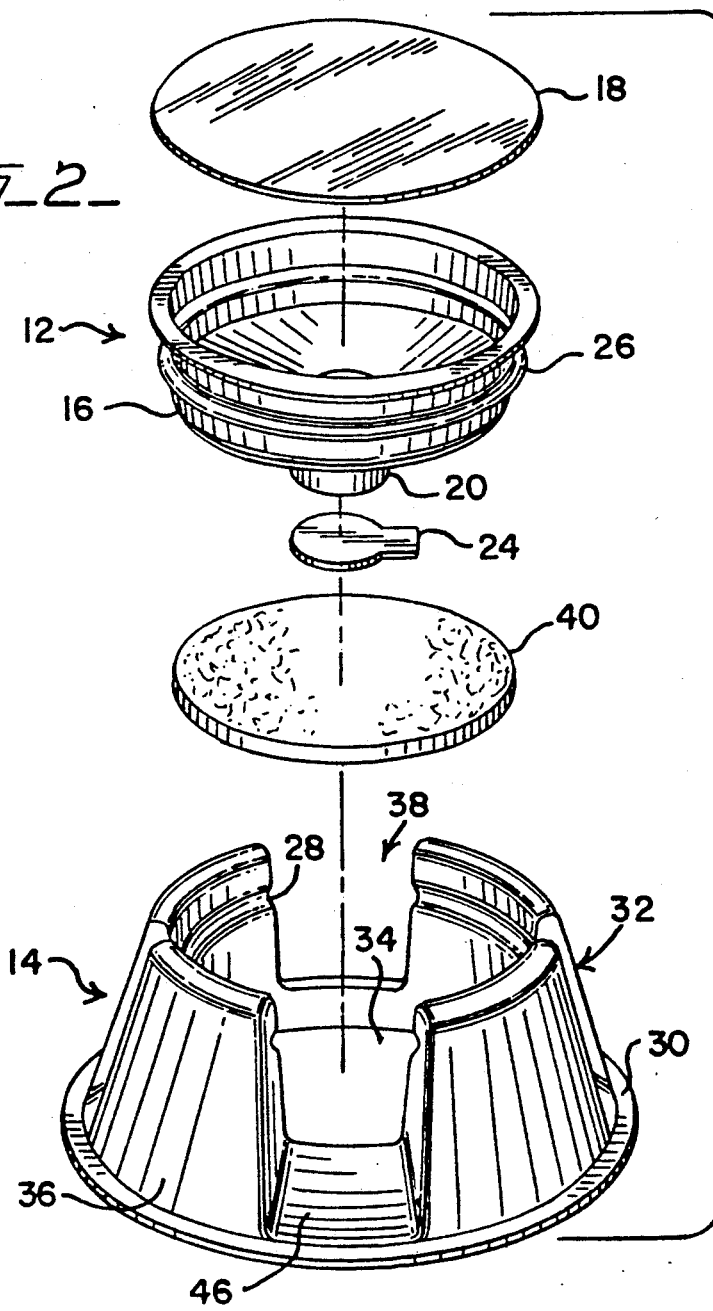
FIG. 2 is an exploded perspective view of the bait station showing the reservoir cover, reservoir, pull-tab seal, absorbent pad, and base structure.

FIG. 2 shows an exploded perspective view of bait station 10. Reservoir 12 is shown located above base structure 14 in the orientation in which reservoir 12 would be placed into base structure 14.

Reservoir 12 has funnel body 16, which has, at one end, reservoir cover 18. At the other end of reservoir 12 is funnel structure 20, which narrows down to funnel opening 22 (not visible in FIG. 2). A liquid bait-toxicant solution is placed in reservoir 12 during the initial assembly of bait station 10. Funnel opening 22 is covered by pull-tab seal 24 (shown in FIG. 7) or other means for controlling the release of the solution. The user of the bait station will remove or otherwise activate this control release means.

Base structure 14 has peripheral rim 30. Rising from and angled inwardly from peripheral rim 30 is support structure 32. Support structure 32 defines central well area 34.

Rising from and projecting above support structure 32 are support walls 36. Support walls 36 serve to accept and support reservoir 12 and to define insect access openings 38. Insect access openings 38 have, at the bottom of each opening, ramp 46.

Around the perimeter of funnel body 16 is encircling ridge 26, which is designed to snap fit into channel 28, which is formed into the inner surface of support walls 36 of base structure 14.

Shown located between reservoir 12 and base structure 14 is pad 40. Pad 40, which is preferably made of a non-woven absorbent fibrous material, is so formed as to fit within and on the bottom of central well area 34.

FIG. 3 is a top plan view of base structure 14, but showing central well area 34, support structure 32, support walls 36 and access ramps 46.

FIG. 4 is a side sectional view of base structure 14 taken along line 4—4 of FIG. 3, showing central well area 34, support structure 32, support walls 36 and access ramps 46.

FIG. 5 is a top plan view of reservoir 12, showing reservoir cover 18, funnel body 16, funnel structure 20 and funnel opening 22.

FIG. 6 is a side sectional view of reservoir 12 taken along line 6—6 of FIG. 5. In this view, the means for controlling release of the solution within reservoir 12 is pull-tab seal 24 located across and below funnel opening 22. Other sealing means may be used to seal reservoir 12, such as a covering placed over or integrally formed across funnel opening 22. If such a covering is used, controlled or metered liquid escape from the reservoir may be obtained by piercing the cover. Such piercing may be performed either by the user or by means of a projection rising from the floor of central well area 34 which would pierce the covering when the reservoir is fitted into the base structure. Such a projection could have grooves formed therein to better control and direct the release of liquid from the reservoir.

FIG. 7 is a side sectional view of assembled bait station 10. The sectional view of reservoir 12 shown in FIG. 7 is the same as that shown in FIG. 6. The sectional view of base structure 14 is the same as that of FIG. 4 except that part of FIG. 4 is now replaced by the sectional view of reservoir 12. Between reservoir 12 and base structure 14 is shown pad 40.

In use, reservoir 12 will be filled with an aqueous bait-toxicant formulation, preferably one having a delayed kill action. An example of a suitable bait-toxicant formulation would comprise 0.5% chlorpyrifos insecticide, 5.0% isoparrafinic hydrocarbon (BP 208°–289° C.), 1.0% HLB-12 emulsifier, 10.0% sucrose, and 83.5% water. Other aqueous formulations containing insecticides and bait components may also be used.

Bait station 10 is used for control of insects, especially roaches, as follows:

Bait station 10 is activated, by removal of pull-tab seal 24 (or piercing of the cover) of reservoir 12, and reservoir 12 is fitted into base structure 14 (which is inverted for assembly to prevent premature release of the liquid bait-toxicant solution).

Assembled bait station 10 is then placed, base structure 14 down, on the floor or on the bottom of a cabinet or other location where roaches have been observed.

The liquid bait-toxicant solution within reservoir 12 seeps out onto pad 40 and spreads by capillary action.

Roaches are attracted to the station to find a dark harborage and to seek the moisture offered by now damp pad 40. They enter through access opening 44, climb ramp 46 and reach central well area 34 which contains pad 40. They then feed upon the bait-toxicant solution, which, as said, preferably contains delayed action insecticide, return to their usual hiding places within walls or behind cabinets and die. The dead roaches, which are now toxic, will then be cannibalized by other roaches, extending the kill action of the station to roaches which have not contacted the station directly.

Other modifications of the bait station of the present invention will become apparent to those skilled in the art from an examination of the above patent Specification and drawings. Therefore, other variations of the present invention may be made which fall within the scope of the following claims even though such variations were not specifically discussed above.

Industrial Applicability

The liquid delivery bait station of the present invention may preferably be used to control cockroach populations wherever such control is desired. The units are intended to be manufactured and sold in multiple arrays and are intended to be disposable after use.

What I claim is:

1. A bait station comprising a base structure and a reservoir for containing liquid, the base structure further comprising:
   a peripheral rim;
   a support structure angled upwardly and inwardly from the peripheral rim, the support structure defining a central well area and comprising a plurality of support walls rising from the peripheral rim, the support walls having inner surfaces coextensive with an outer circumference of the central well area and being spaced at intervals around the support structure, the support walls serving to define access openings to the central well area;
   the reservoir further comprising a funnel body having an upper portion open at one end and an essentially funnel-shaped lower portion, the funnel-shaped lower portion having an opening at its narrowest end, and a cover designed to fit over the open end of the upper portion of the reservoir;
   the reservoir portion being designed to fit onto and within the base structure in such a way that the upper portion of the reservoir fits within the support walls of the base structure and the opening at the narrowest end of the lower portion is positioned within and over the central well area of the base structure; and
   means for allowing controlled release of liquid form the reservoir into the central well area.

2. A bait station according to claim 1 wherein a pad of fibrous material is placed within the central well area, the pad being so sized as to be in contact with a funnel opening when the station is assembled so that liquid within the reservoir seeps out onto the pad of fibrous material and saturates the pad by capillary action.

3. A bait station according to claim 1 wherein the cover of the reservoir is transparent so as to allow visual observation of the level of liquid in the reservoir.

4. A bait station according to claim 1 wherein the means for allowing controlled release of the liquid from the reservoir into the central well area comprises a pull-tab seal which covers the opening at the narrowest end of the reservoir.

5. A bait station according to claim 1 wherein the plurality of support walls rising from the peripheral rim and projecting above and spaced at intervals around the support structure comprises four equally spaced support walls having a generally trapezoidal shape, narrower at the top, and having inner surfaces coextensive with the outer circumference of the central well area.

6. A bait station according to claim 1 wherein the reservoir and the base structure are formed from plastically deformable material.

* * * * *